United States Patent
Milius et al.

(10) Patent No.: US 6,583,102 B2
(45) Date of Patent: Jun. 24, 2003

(54) ANTIFOAMING COMPOSITIONS AND INTERMEDIATE ANHYDROUS COMPOSITIONS

(75) Inventors: Alain Milius, Nice (FR); Jean-Pierre Boiteux, Saix (FR); Maryse Carrausse, Castres (FR)

(73) Assignee: Societe D'Exploitation de Produits Pour Les Industries Chimiques Seppic, Paris Cedex (FR)

( * ) Notice: Subject to any disclaimer, the term of this patent is extended or adjusted under 35 U.S.C. 154(b) by 0 days.

(21) Appl. No.: 09/866,619

(22) Filed: May 30, 2001

(65) Prior Publication Data

US 2002/0142936 A1 Oct. 3, 2002

Related U.S. Application Data

(62) Division of application No. 09/284,846, filed as application No. PCT/FR97/01840 on Oct. 15, 1997, now Pat. No. 6,300,298.

(30) Foreign Application Priority Data

Oct. 22, 1996 (FR) .............................................. 96 12819

(51) Int. Cl.$^7$ .............................. C11D 3/22; C11D 1/72; C11D 13/10; C11D 1/825
(52) U.S. Cl. ...................... 510/470; 510/238; 510/239; 510/240; 510/413; 510/475; 510/535
(58) Field of Search ................................. 510/238, 239, 510/240, 413, 470, 475, 535

(56) References Cited

U.S. PATENT DOCUMENTS

| | | | |
|---|---|---|---|
| 3,215,636 A | 11/1965 | Hagge et al. ................ | 252/321 |
| 3,640,998 A | 2/1972 | Mansfield et al. ...... | 260/210 R |
| 3,954,886 A | 5/1976 | Langdon ................. | 260/615 A |
| 4,011,389 A | 3/1977 | Langdon ......................... | 536/4 |
| 4,077,894 A | 3/1978 | Langdon et al. ............. | 252/331 |
| 5,164,116 A | 11/1992 | Berkhof et al. ......... | 252/174.17 |
| 5,205,959 A * | 4/1993 | Schmid et al. ......... | 252/174.17 |
| 5,866,530 A | 2/1999 | Schmid et al. .............. | 510/438 |
| 5,958,431 A | 9/1999 | Brancq et al. .............. | 424/401 |
| 6,015,839 A * | 1/2000 | Milius ........................ | 516/134 |
| 6,177,396 B1 * | 1/2001 | Clapperton et al. .......... | 510/405 |
| 6,300,298 B1 * | 10/2001 | Milius et al. ................ | 510/214 |
| 6,337,352 B1 * | 1/2002 | Milius ........................ | 516/134 |

FOREIGN PATENT DOCUMENTS

| | | | |
|---|---|---|---|
| EP | WO 91/14760 | * 10/1991 | ........... C11D/1/825 |
| WO | WO 9114760 | 10/1991 | |
| WO | WO 9633255 | 10/1996 | |

* cited by examiner

Primary Examiner—Yogendra N. Gupta
Assistant Examiner—Brian P Mruk
(74) Attorney, Agent, or Firm—Young & Thompson

(57) ABSTRACT

A method for preparing an antifoaming composition containing:

a) at least one compound of formula (I):

$$(Z)_y\text{-}(G)_x\text{—}O\text{—}R_A \qquad (I);$$

b) at least one compound of formula (II):

$$Z\text{—}O\text{—}[CH_2CH(R_1)\text{—}O]_n\text{—}R_a \qquad (II);$$

c) optionally one or more compounds of formula (IV):

$$(G)_x\text{—}O\text{—}R_A \qquad (III), \text{ and}$$

d) optionally one or more compounds of formula (IV):

$$HO\text{—}[CH_2\text{—}CH(R_1)\text{—}O]_n\text{—}R_B \qquad (IV).$$

7 Claims, No Drawings

ANTIFOAMING COMPOSITIONS AND INTERMEDIATE ANHYDROUS COMPOSITIONS

This application is a division of co-pending Application No. 09/284,846, filed on May 24, 1999 now U.S. Pat. No. 6,300,298. Application Ser. No. 09/284,846 is the national phase of PCT International Application No. PCT/FR97/01840 filed on Oct. 15, 1997 under 35 U.S.C. §371. The entire contents of each of the above-identified applications are hereby incorporated by reference.

FIELD OF THE INVENTION

The present invention relates to antifoaming compositions and to intermediate anhydrous compositions.

BACKGROUND OF THE INVENTION

Some industrial cleaning operations, such as the cleaning of bottles or cleaning in place, can result in the formation of a significant degree of foam. It is due in particular to the presence of food stains or of sticky residues present on the bottles. For the purpose of decreasing or even preventing the formation of this foam, it is known to add one or more defoaming surfactants to the cleaning composition. These defoaming surfactants are generally of the non-ionic type.

One of the subject-matters of the present invention consists of novel surfactant compositions which are derived from alkylpolyglycosides.

Alkylpolyglycosides are well-known non-ionic surfactants. Their manufacturing process is disclosed, for example, in Patent Application EP-A-0 077 167.

However, to date, it is impossible to use surfactant compositions based on alkylpolyglycosides which are devoid of water or devoid of fatty alcohol. This is because the very high melting temperatures of alkylpolyglycosides do not allow them to be handled in anhydrous form. They are therefore diluted in water or presented as a mixture with one or more fatty alcohols.

Patent Application EP-A-0 489 777 discloses antifoaming compositions comprising alkylpolyglycosides in which the alkyl chain comprises from 6 to 12 carbon atoms.

German Patent Application No. DE 38 35 199 discloses alkylpolyglycosides blocked by an arylmethyl or alkyl radical exhibiting antifoaming properties.

However, it is clear to a person skilled in the art that the blocking reaction employed in this publication cannot be applied to the many blocking reagents which decompose in water. In another aspect of the present invention, the Applicant Company has therefore sought to develop a novel blocking process which involves anhydrous intermediates which are devoid of fatty alcohols.

SUMMARY OF THE INVENTION

The subject-matter of the invention is therefore the composition (A) comprising:
a) at least one compound of formula (I)

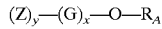
$(Z)_y$—$(G)_x$—O—$R_A$ (I)

b) at least one compound of formula (II)

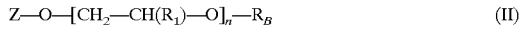
Z—O—[CH$_2$—CH(R$_1$)—O]$_n$—R$_B$ (II)

c) optionally one or more compounds of formula (III)

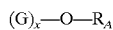
$(G)_x$—O—$R_A$ (III), and d) optionally one or more compounds of formula (IV)

HO—[CH$_2$—CH(R$_1$)—O]$_n$—R$_B$ (IV)

such that the ratio by weight of the compound of formula (I) to the compound of formula (II) is between 0.1 and 10,
the ratio by weight: compound of formula (III)/compound of formula (I) is between 0 and 1, and
the ratio by weight: compound of formula (IV)/compound of formula (II) is between 0 and 1, in which formulae (I), (II), (III) and (IV):

Z represents:
  either a —CH(CH$_3$)—O—R$_2$ group, in which R$_2$ represents a saturated or unsaturated, linear or branched, aliphatic hydrocarbon-comprising radical comprising from 1 to 30 carbon atoms,
  or a —CH$_2$—CH(OH)—R$_3$ radical, in which R$_3$ represents a linear or branched alkyl radical comprising from 1 to 4 carbon atoms;

y represents a decimal number of greater than 0 and less than or equal to 3x+1;

x represents a decimal number of between 1 and 5;

n is an integer of between 1 and 30;

R$_1$ represents a hydrogen atom or a methyl radical;

G represent the residue of a saccharide;

R$_A$ and R$_B$ represent, independently of one another, a saturated or unsaturated, linear or branched, hydrocarbon-comprising radical comprising from 1 to 30 carbon atoms.

DETAILED DESCRIPTION OF THE INVENTION

When Z represents a —CH(CH$_3$)—OR$_2$ group, it is in particular the 1-methoxyethyl, 1-ethoxyethyl, 1-propoxyethyl, 1-isopropoxyethyl, 1-butoxyethyl, 1-isobutoxyethyl, 1-(pentyloxy) ethyl, 1-(dodecyloxy)-ethyl or 1-(octadecyloxy)ethyl radical.

When Z represents a —CH$_2$—CH(OH)—R$_3$ radical, it is in particular the 2-hydroxybutyl radical.

The term "saturated or unsaturated, linear or branched, hydrocarbon-comprising radical comprising from 1 to 30 carbon atoms" denotes in particular, for R$_A$ and/or R$_B$, alkyl radicals or alkenyl radicals.

The term "residue of a saccharide" denotes, for G, a polyvalent radical resulting from the removal from a sugar molecule, on the one hand, of a hydrogen atom of a hydroxyl group and, on the other of the anomeric hydroxyl group.

The term "saccharide" denotes in particular glucose or dextrose, fructose, mannose, galactose, altrose, idose, arabinose, xylose, ribose, gulose, lyxose, sucrose, maltose, maltotriose, lactose, cellobiose, dextran, talose, allose, raffinose, levoglucosan, cellulose or starch.

The oligomeric structure (G)$_x$ can exist in any isomeric form, whether relating to optical isomerism, geometrical isomerism or positional isomerism; it can also represent a mixture of isomers. In the formulae (I) and (III) as defined above, the O—R$_A$ group is bonded to G via the anomeric carbon, so as to form an acetal functional group.

In the definitions of the formulae (II) and (IV), the —[CH$_2$—CH(R$_1$)—O]$_n$ group indicates that it can be either a chain composed solely of ethoxyl groups (R$_1$=H) or a chain composed solely of propoxyl groups (R$_1$=CH$_3$) or a chain composed of both ethoxyl and propoxyl groups. In the latter case, the —CH$_2$CH$_2$O and —CH$_2$—CH(CH$_3$)—O fragments are distributed in a block or random manner.

In the formula (I) as defined above, the Z group or groups are bonded to $(G)_x$ via an oxygen atom of one of its hydroxyl functional groups.

When, in the composition as defined above, there are several compounds of formulae (I), (II), (III) and/or (IV), they are distinguished from one another by the definitions of $R_A$ and $R_B$ and, optionally, in the case of products of formula (I), by the values of y.

In a first preferred alternative form of the present invention, G represents the glucose residue, x, which represents the mean degree of polymerization of the saccharide, is between 1.05 and 2.5 and in particular between 1.1 and 2.0, and y is less than or equal to 2.

The composition as defined above in which the ratios by weight: compound of formula (III)/compound of formula (I) and compound [lacuna] (IV)/compound of formula (II) are equal to 0 constitutes a second preferred alternative form of the present invention; in this case, the composition therefore comprises neither compound of formula (III) nor compound of formula (IV).

In a third preferred alternative form of the present invention, n is less than or equal to 15 in the formulae (II) and (IV).

In a fourth preferred alternative form of the present invention, in the formulae (I), (II), (III) and (IV), $R_A$ and $R_B$ comprise, independently of one another, from 6 to 18 carbon atoms and represent in particular a hexyl, heptyl, octyl, nonyl, decyl, undecyl, dodecyl, tridecyl, tetradecyl, hexadecyl, octadecyl, octadecenyl, octadecadienyl or octadecatrienyl radical, the said radicals being linear or branched.

In a fifth preferred alternative form of the present invention, in the formulae (I) and (II), Z represents a 1-(octadecyloxy)ethyl, 1-isobutoxyethyl or 2-hydroxybutyl group.

A particular subject-matter of the invention is the composition as described above, comprising one or more compounds of formula (I), one or more compounds of formula (II), optionally one or more compounds of formula (III) and optionally one or more compounds of formula (IV), in which composition, in the formulae (I), (II), (III) and (IV), the substituents $R_A$ and $R_B$ are identical and represent an octyl, nonyl, decyl or 2-ethylhexyl radical.

Another subject-matter of the invention is a process for the preparation of the composition (A) as defined above, characterized in that the sugar of formula (V)

$$H-G-OH \qquad (V)$$

is reacted in acidic medium with an excess of at least one alcohol of formula (VI)

$$HO-R_A \qquad (VI)$$

one compound of formula (III) and the mixture in excess of at least one alcohol of formula (VI), to which mixture (B) is added at least one compound of formula (IV) in a ratio by weight of compounds of formula (III) to compounds of formula (IV) of between 0.1 and 10, in order to form a mixture (C), which mixture is neutralized and then subjected to a distillation stage in order to remove the excess alcohol of formula (VI) and thus to form the anhydrous composition (D) comprising at least one compound of formula (III) and at least one compound of formula (IV), which anhydrous composition (D) is reacted with a compound of formula (VII)

$$Z'-A \qquad (VII)$$

capable of reacting with one or more hydroxyl functional groups of the $(G)_x$ group, in order to result in the composition (A).

In an alternative form of the process described above, when $R_A$ represents the radical derived from a fatty alcohol, the compound of formula (III) can be obtained by first preparing an alkylpolyglycoside with a light alcohol, such as methanol or butanol, by etherification of the corresponding saccharide, and then, in a second stage, by carrying out a transetherification with the alcohol of formula (VI) and by distilling off the light alcohol.

The term "compound of formula (VII)" denotes in particular epoxides, such as, for example, butylene oxide, or alkyl vinyl ethers, such as, for example, isobutyl vinyl ether or octadecyl vinyl ether.

In a preferred alternative form of the process as described below, the substituents $R_A$ and $R_B$ are identical.

In another preferred alternative form of the process as described above, the glucose is mixed [sic] with a fatty alcohol fraction corresponding to a mixture of alcohols of formula (VI), in order to form the corresponding mixture $(B_1)$ of alkylpolyglucosides of formula $(III_1)$, corresponding to compounds of formula (III) in which G represents the glucose residue, and of the excess of the fatty alcohol fraction, to which mixture $(B_1)$ is added a mixture of alkoxylated compounds of formula $(IV_1)$, prepared from the same fatty alcohol fraction, in a ratio by weight of compounds of formula $(III_1)$ to compounds of formul $(IV_1)$ of between 0.2 and 5, in order to form a mixture $(C_1)$, which mixture is neutralized and then subjected to a distillation in order to form the anhydrous composition $(D_1)$ comprising a mixture of compounds of formula $(III_1)$ $$(G_1)_x-O-R_A \qquad (III_1),$$

in which $G_1$ represents the glucose residue, and a mixture of alkoxylated compounds of formula $(IV_1)$ $$HO-[CH_2-CH(R_1)-O]_n-R_A \qquad (IV_1),$$

which anhydrous composition $(D_1)$ is reacted with an alkyl vinyl ether in order to form the composition $(A_1)$ comprising:

a) a mixture of compounds of formula (II)

$$[R_2-O-CH(CH_3)]_y-[(G_1)_x-O-R_A] \qquad (I_1)$$

b) a mixture of compounds of formula $(II_1)$ $$R_2-O-CH(CH_3)-O-[CH_2-CH(R_1)-O]_n-R_A \qquad (II_1)$$

c) optionally a mixture of compounds of formula (III)

$$(G_1)_x-O-R_A \qquad (III_1), \text{ and}$$

d) optionally a mixture of compounds of formula $(IV_1)$ $$HO-[CH_2-CH(R_1)-O]_n-R_A \qquad (IV_1).$$

In another preferred alternative form, $D_1$ is reacted with butylene oxide in order to give the final composition $(A_2)$ comprising:

a) a mixture of compounds of formulae [sic] $(I_2)$ $$[CH_3-CH_2-CH(OH)-CH_2]_y-[(G_1)_x-O-R_A] \qquad (I_2)$$

b) a mixture of compounds of formulae [sic] $(II_2)$ $$CH_3-CH_2-CH(OH)-CH_2-O-[CH_2-CH(R_1)-O]_n-R_A \quad (II_2)$$

c) optionally a mixture of compounds of formula (III$_1$)

$$(G_1)_x-O-R_A \qquad (III_1), \text{ and}$$

d) optionally a mixture of compounds of formula (IV$_1$)

$$HO-[CH_2-CH(R_1)-O]_n-R_A \qquad (IV_1).$$

The compounds of formula (VI) are known to a person skilled in the art and are commercially available. The fatty alcohol fractions are also for their part known to a person skilled in the art; some are commercially available or can be obtained according to conventional methods from natural fats or oils, such as, for example, coconut oil, palm kernel oil, palm oil, soybean oil, rapeseed oil, castor oil, beef tallow or herring oil.

The alkoxylated compounds of formulae [sic] (IV) are commercially available or obtained by the action of ethylene oxide and/or propylene oxide on the corresponding alcohols, according to conventional methods known to a person skilled in the art.

Another subject-matter of the invention is the anhydrous composition (D) and in particular the anhydrous composition (D$_1$) which are intermediates in the process and in its alternative form which are described above.

The composition (A) which is a subject-matter of the invention is surface active and it also exhibits advantageous antifoaming properties. This property makes it possible to use it in many types of industry.

In the farm-produce industry, these products can be used in the cleaning and disinfecting of containers which may be in contact with foodstuffs; they can also be used as antifoaming agent in the extractive farm-produce industries, such as sugar refineries or starch manufacturing plants, in the fermentation industries, such as plants for production of amino acids, organic acids or enzymes, and in the livestock fodder industries.

The composition (A) according to the invention can generally be used in the cleaning of hard surfaces.

Finally, these products can be used in detergent formulations for household use, such as domestic cleansing products.

Each of the uses mentioned above represents in itself an aspect of the present invention.

An antifoaming composition according to the invention can be provided in a concentrated form or in a dilute form which is ready for use.

When it is provided in a concentrated form, it can comprise from 5 to 70% by weight of at least one compound of formula (I) and from 5 to 70% by weight of at least one compound of formula (II).

When it is provided in a dilute form, it can comprise from 0.004% to 20% by weight of at least one compound of formula (I) and from 0.004% to 20% by weight of at least one compound of formula (II).

The intermediate compositions (D) and (Dl) of the process are surface active in themselves and can also be used for this property in dilute or ready-for-use form, as is described for the composition (A).

According to another aspect of the invention, a cleaning composition comprises from 2 to 50% by weight of one or more alkaline agents, such as, for example, sodium hydroxide or potassium hydroxide, and between 0.001 and 10% by weight of the composition (A) as defined above.

The following examples illustrate the invention without, however, limiting it.

EXAMPLE OF THE PREPARATION OF A COMPOSITION ACCORDING TO THE INVENTION

A) Preparation of a Composition D a) A mixture of fatty alcohols comprising 50% by weight of octanol and 50% by weight of decanol is reacted, under acid catalysis, with glucose monohydrate in a molar ratio alcohol/glucose=2.6/1. A mixture of 55% by weight of $C_8$–$C_{10}$ APG, having a degree of polymerization equal to approximately 1.9, and of 45% of free fatty alcohols is obtained.

b) A mixture of fatty alcohols comprising 50% by weight of octanol and 50% of decanol is reacted with ethylene oxide and then propylene oxide, so as to obtain, on each of the alcohols, a pentaethoxylation and then a tetrapropoxylation.

c) A mixture comprising approximately ⅓ of polyalkoxylated alcohol prepared in stage b) and ⅔ of the APG+fatty alcohol mixture prepared in stage a) is subsequently prepared; the mixture is neutralized to pH 5.6 and then the fatty alcohols are removed by distillation.

An APG/polyalkoxylated alcohols anhydrous composition (D$_{1a}$), having an OH number equal to 471, is thus obtained, which corresponds to a composition (D$_1$) in which, for the formulae (III$_1$) and (IV$_1$), G represents a glucose residue,
x is equal to 1.9,
R$_A$ represents an octyl radical or a decyl radical,
n is equal to 9, and
R$_1$ represents a hydrogen atom or a methyl radical.

By proceeding in a way analogous to Example A, from a $C_{12}$–$C_{16}$ alcohol fraction in a molar ratio with the glucose of 4/1 and an alkoxylation with 6 mol of ethylene oxide, the APG/polyalkoxylated alcohols anhydrous composition (Dlb) was prepared, which corresponds to a composition (D$_1$) in which, for the formulae (III$_1$) and (IV$_1$), G represents a glucose residue,
x is equal to 1.45,
R$_A$ represents a dodecyl radical, a tetradecyl radical or a hexadecyl radical,
m is equal to 6, and
R$_1$ represents a hydrogen atom.

B) Preparation of Compositions (A)

a) Blocking with alkyl vinyl ethers.

The anhydrous composition (Dla) obtained in stage A has vinyl isobutyl ether added to it over 1 hour at 80° C., in a ratio of 0.6 mol/mole of surfactant, in the presence of a catalytic amount of concentrated phosphoric acid. After 5 hours at 110° C., the desired composition (A$_{1a}$) is obtained; OH number (I$_{OH}$)=319; cloud point (10% butyl diglycol (BDG))=57.5° C.

By proceeding in an analogous way with 0.9 mol/mole of vinyl isobutyl ether, the composition (A$_{1b}$) is obtained; I$_{OH}$=273.9; cloud point (10% BDG)=50° C.

By proceeding in an analogous way with 1.2 mol/mole of vinyl isobutyl ether, the composition (A$_{1c}$) is obtained; I$_{OH}$=231.4, cloud point (10% BDG)=41° C.

By proceeding in an analogous way with 0.6 mol/mole of vinyl octadecyl ether, the composition (A$_{1d}$) is obtained; I$_{OH}$=272.4.

b) Blocking with butylene oxide.

The reaction is carried out in the presence of sodium methoxide in methanol at 125° C. with 0.6 mol/mole of butylene oxide for 12 hours; the composition (A$_{2a}$) is obtained; I$_{OH}$=416; cloud point (1% water)=47° C.

c) Analysis of the antifoaming properties of the compositions according to the invention.

(i) various solutions were prepared comprising (% by weight):

| | |
|---|---|
| a surfactant composition | 0.012 |
| 10% alkaline base | 3 |
| Régilait ® powdered milk as a 10% dispersion | 7.5 |
| deionized water | q.s. for 100, | the alkaline base comprising (% by weight):

| | |
|---|---|
| sodium tripolyphosphate: | 3.5 |
| sodium metasilicate $5H_2O$: | 4.2 |
| anhydrous sodium carbonate: | 2.3 |
| deionized water | q.s. for 100, |

(ii) the solution was subjected to rotary stirring for three minutes and the height of foam (in mm) formed was measured after standing for 5 seconds. The stirring was such that a similar solution, but not comprising defoaming surfactant, formed a foam with a height of 30 mm. The following results were obtained:

| A antifoaming agent | Height of foam (mm) |
|---|---|
| $A_{1a}$ | 15 |
| $A_{1b}$ | 9 |
| $A_{1c}$ | 9 |
| $A_{1d}$ | 14 |
| $A_{2a}$ | 22 |
| Without antifoaming agent | 30 |

These results clearly demonstrate the anti-foaming properties of the compositions according to the invention.

What is claimed is:

1. A process for the preparation of a composition (D), comprising:

mixing a sugar of formula (V):

$$H-G-OH \quad (V)$$

in acidic medium with an excess of at least one alcohol of formula (VI):

$$HO-R_A \quad (VI)$$

thereby to form a reaction mixture comprising at least one alcohol of formula (VI) and at least one compound with the following formula (III):

$$(G)_x-O-R_A \quad (III),$$

mixing said reaction mixture with a compound of the following formula (IV):

$$HO-[CH_2-CH(R_1)-O]_n-R_B \quad (IV),$$

in a weight ratio of (III)/(IV) between 0.1 and 10, thereby to form a mixture comprising at least an alcohol of formula (VI), a compound of formula (III) and at least one compound of formula (IV), neutralizing said mixture, and distilling said mixture to obtain said composition (D), said (D) composition consisting essentially of:

(a) at least one compound of the formula (III):

$$(G)_x-O-R_A \quad (III)$$

and (b) at least one compound of the formula (IV):

$$HO-[CH_2-CH(R_1)-O]_n-R_B \quad (IV)$$

wherein x represents a decimal number between 1 and 5, n represents an integer between 1 and 30, $R_1$ represents hydrogen or methyl, G represents the residue of a saccharide, $R_A$ and $R_B$ represent independently of one another, a saturated or unsaturated, linear or branched hydrocarbon comprising 1 to 30 carbon atoms, and said composition (D) being devoid of water and of fatty alcohols.

2. A process as claimed in claim 1, wherein said saccharide is glucose, and x is between 1.05 and 2.5.

3. A process as claimed in claim 1, wherein RA and RB are, independently of one another, linear or branched hexyl, octyl, heptyl, nonyl, decyl, undecyl, dodecyl, tridecyl, tetradecyl, hexadecyl, octadecyl, octadecenyl, octadecadienyl, or octadecatrienyl.

4. A process as claimed in claim 1, in which $R_A$ and $R_B$ are identical and are octyl, nonyl, decyl, or 2-ethylhexyl.

5. A process as claimed in claim 1, wherein said saccharide is glucose.

6. A process as claimed in claim 1, wherein RA and RB are identical.

7. A process as claimed in claim 1, wherein said saccharide is glucose, is mixed in acidic medium with an excess of a mixture of alcohols of formula (VI) in order to form a mixture of compounds of formula (VI) and compounds of formula (III), the last-named mixture is then mixed with a mixture of compounds $(IV_1)$ $$HO-[CH_2-CH(R_1)-O]_n-R_A \quad (IV_1)$$

in a weight ratio of (III)/(IV) between 0.2 and 5, in order to form a mixture of compounds of formula (VT) and formula (I) and formula (IV), which mixture is then subjected to said neutralization and distillation steps.

* * * * *